May 18, 1937.  G. W. CLARK  2,080,698
BICYCLE FRAME AND METHOD OF MAKING SAME
Filed Feb. 20, 1935  2 Sheets-Sheet 1
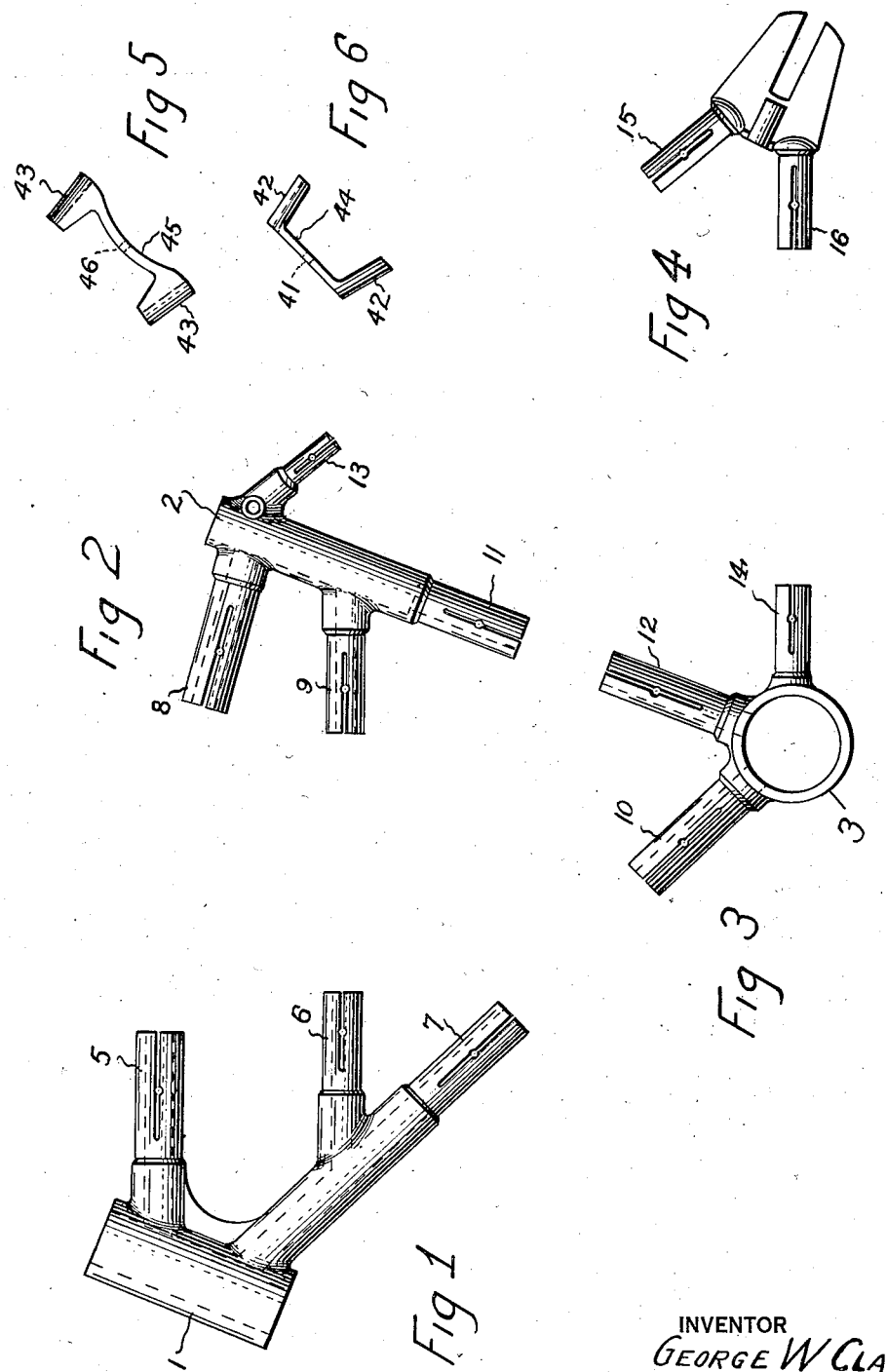
INVENTOR
GEORGE W CLARK
BY Chapin + Neal
ATTORNEYS May 18, 1937.  G. W. CLARK  2,080,698
BICYCLE FRAME AND METHOD OF MAKING SAME
Filed Feb. 20, 1935   2 Sheets-Sheet 2
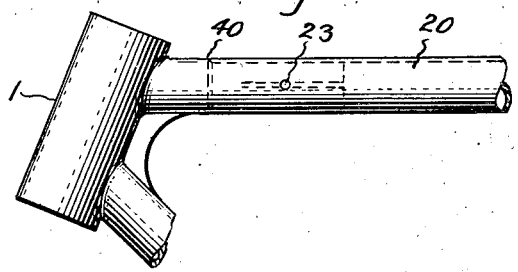
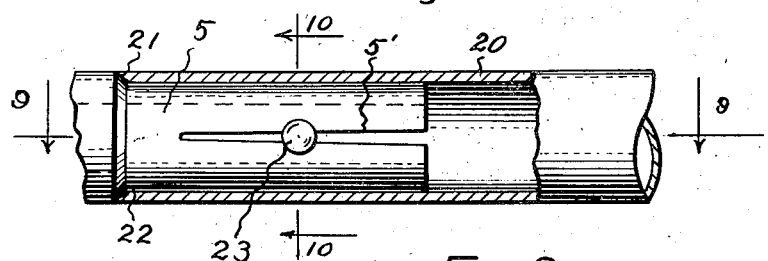
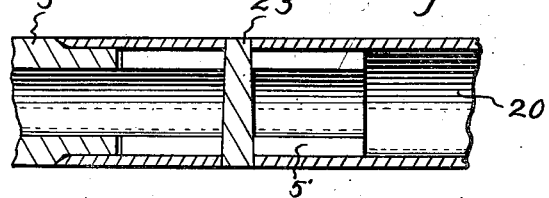
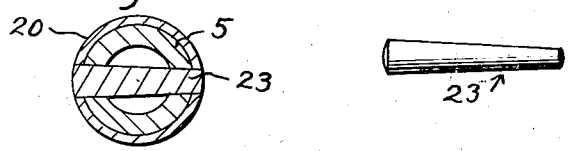
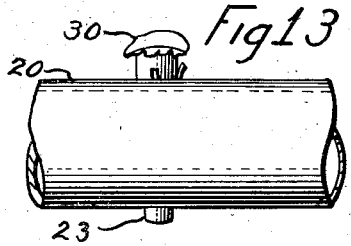
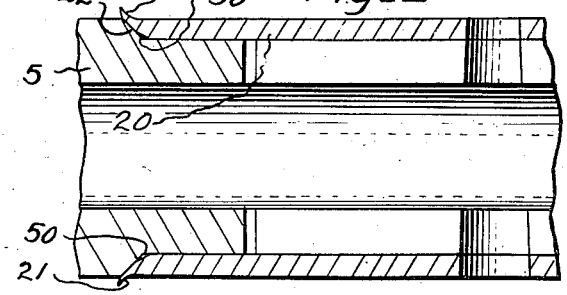
INVENTOR
GEORGE W CLARK
BY Chapin + Neal
ATTORNEYS Patented May 18, 1937

2,080,698

UNITED STATES PATENT OFFICE 2,080,698

BICYCLE FRAME AND METHOD OF MAKING SAME

George W. Clark, Westfield, Mass., assignor to The Westfield Manufacturing Company, Westfield, Mass., a corporation of Massachusetts Application February 20, 1935, Serial No. 7,427

11 Claims. (Cl. 29—148.2)

This invention relates to an improvement in bicycle construction and the like. It is particularly concerned with the way of assembling the frame and, in that work, joining the comparatively thin tubes with the thicker and shorter tubular elements such as the head post, seat post, and crank case parts of the frame. The general object is to satisfactorily join these parts without brazing, and the particular object is to do this in such an improved manner that a bicycle manufacturer will attain the desired final result to his satisfaction.

The specific objects of the invention are to make a bicycle frame by improvements in the steps of making the joints between the tubular frame parts and those principal supporting parts of the frame, such as the head post cluster, seat post cluster, crankcase cluster, etc., that are spaced apart by the tubular frame parts. The improvements will be disclosed in detail with reference to the prior art and the distinctions over such art being described in detail and then pointed out in the various claims.

The prior art found in U. S. patents to Belcher et al. 620,832 and 620,833 illustrates a part of the problem of making bicycle frame joints, when brazing is objectionable for any reason, as when aluminum metal is used. These patents do not give me a solution of my problem for various reasons. I am aware also of the pending application of Charles B. Travis, Jr., for an improved joint, relating to bicycle manufacture, as my employer is buying parts from Travis' assignee and we are both generally familiar with what the other is doing and are cooperating in building bicycle frames from aluminum metal. My invention is distinguished from the said Travis application as filed by him in ways which will be clear from the description and claims herein.

My idea is principally to make a satisfactory bicycle frame of aluminum metal by which I mean to include its stronger alloys of light weight. But the invention is also important in making tubular frames of other metal and for such other than bicycle purposes as require the equivalent considerations in getting the desired advantages. I will disclose the details of the invention with particular relation to making bicycles.

To cut down the cost of machine work and the hand labor involved in brazing and polishing, I use the following procedure. The thin metal tubes are first made as usual. The thicker tubular parts, which I will call clusters, to receive and support the thin tubes are preferably made out of cast parts which can be conditioned by very little machining. These thicker parts are the head post cluster, the seat post cluster, the crank case cluster, and the rear fork clusters, although the latter can be made of stamped metal. With this general plan, my invention is in the manner of constructing the parts for improved assembly and final joining in completed frame form.

Referring to the drawings,

Figs. 1, 2, 3, and 4 are side views respectively of the head post, seat post, crank case, clusters and one rear fork cluster, all these figures being generally spaced and arranged to indicate the parts positioned for a bicycle frame;

Figs. 5 and 6 are detail views of braces for the top and bottom rear fork tubes;

Fig. 7 is a detail view indicating the way in which the joint is made between the forward end of the top bar or tube with the head post cluster;

Fig. 8 is a detail of the joint indicated in Fig. 7, with part of the top tube cut away;

Fig. 9 is a section on line 9—9 of Fig. 8;

Fig. 10 is a section on line 10—10 of Fig. 8;

Fig. 11 is a view of the tapered joint pin;

Fig. 12 is a detail indicating the nature of the pressure joint made between the parts before the tapered joint pin hole is made and before the pin is hammered home to hold the parts; and Fig. 13 is a detail view indicating the joint pin after it has been hammered home but before trimming.

One will readily see that to complete the bicycle frame indicated by the parts arranged as in Figs. 1 to 4 inclusive it is necessary to supply the thin tubes to connect plugs 5 and 8, plugs 6 and 9, plugs 7 and 10, plugs 11 and 12, plugs 14 and 16, plugs 13 and 15, it being understood that each of the two latter sets of plugs are in duplicate and their companion sets do not show because directly behind those shown and are spaced for the top and bottom rear fork tubes.

When the various tubes are joined with the appropriate plugs to support them and are finally fixed in proper supported position the frame is completely assembled. But in the final assembly it is important to have the frame parts balanced in position, with respect to a central longitudinal plane. This fact is generally well understood in bicycle manufacture; otherwise the frame is warped and twisted out of line. To take care of this it is common to assemble the parts by locating the clusters on a stand where dowels or other contrivances locate them accurately with respect to the desired plane, and the tubes are pushed home against the cluster plugs by moving one or more of the cluster plugs with respect to others and with opposite endwise pressure on the tubes connecting them, all in the desired plane. This is done by a pressure assembly tool or stand.

The ordinary practice when brazed joints are to be made in the frame is to assemble the frame in the pressure stand, pin or spot weld the joints to hold them temporarily and then take the frame to the brazers and, after brazing the joints, return the frame to a pressure stand for final alignment in the desired central plane. The heating of the frame joints in brazing and the handling after assembly ordinarily requires the final alignment operation on the assembly frame or its equivalent.

I have found that with the character of frame indicated for a bicycle, it is particularly important to get my pressure assembly with the head post cluster 1 and its plurality of plugs 5, 6, and 7 in this instance, and both the seat post cluster 2 and crank case cluster 3, with their plurality of plugs 8, 9, and 10, 12 respectively, and the thin connecting tubes between them all assembled at substantially one time and under pressure that is in a broad sense common to all of these connections. This is the assembly that fixes the plane for the bicycle frame and support. You cannot satisfactorily assemble these parts successively under pressure and piece by piece, as by connecting plugs 5 and 8 with a tube pressed endwise between them and fastened, and when that is finished connecting plugs 6 and 9 with a tube, and so on. The important thing is to assemble them in substantially one pressure operation, or rather several pressure operations carried out at substantially the same time. And to get the parts in final and proper position one needs considerable tolerance. In other words, the parts will not assemble properly by predetermined measurements and exact fabrication of parts before assembly. Instead of that they have to be finally pressed together and determine their own measurements by their final positions under pressure. This inability to get the assembly by exact predetermined measurements of the parts, is not so important when the joints are to be finally brazed because the brazing and severe polishing necessary after brazing will cure all defects by filling small joint gaps and result in a smooth, nice appearing joint. But when a cold joint is made, as by pinning the parts together at the end of each thin tube without heating, it is a very real problem how to make that joint right in a pressure assembled bicycle frame where the parts cannot be cut in advance with the precision desired for a good appearing joint. It is on this problem that one principal feature of my invention rests.

To avoid the difficulty as stated and gain other advantages, I make the joint between the tubes and the cluster plugs as follows: Referring to Fig. 8, the plug 5 which is hollow but much thicker than tube 20 is telescoped within the tube 20. The end of the latter is made featheredged, see Fig. 12, as at 21, by the bevel indicated at the end edge of the tube. This bevel edge is, in the pressure assembly, forced toward a cooperating bevel 22 at the end of plug 5, with the general result as indicated in Fig. 12. The bevel 22 is made at a sharper angle so that feather-edge 21 contacts bevel 22 on a circular line. I machine the parts so that such contact will occur. Then when plug 5 and tube 20 are forced under opposite pressures to the exact point related to the other joints being assembled at substantially the same time, as I have described, the feather-edge 21 is pressed outwardly into bell-mouthed form, see Fig. 12. There is considerable tolerance or space afforded before the end of the tube 20 can be bell-mouthed under pressure enough to contact all of bevel 22. This space 50 where the bevels are opposed but out of contact, is the tolerance space and it is inside the tube where it will not show as a gap when the parts do not come together. The weak feather-edge 21 is bent out like an extrusion between the fit of the tube end and the cluster bevel. The feather-edge is provided so as to yield readily outward and let the parts come together.

When the tubes and plugs are pressed together in the frame assembly, they are held under pressure while the tapered holes are reamed for the tapered pin 23. The purpose of the very slight taper in this pin 23 is for expanding the two halves of plug 5 into tighter engagement with tube 20 and the taper is not intended and will not move tube 20 and plug 5 axially in relation to each other. Apart from the function of expanding plug 5 into tighter pressure engagement with tube 20, the pin 23 merely pins the parts together and the nature of the joint is such that there is no substantial shearing action on the pin.

Referring to the single joint shown in Figs. 7 to 12 as illustrative of the way other joints may also be made, I will now describe the sequence of joint making operation. Tube 20 is pressed lengthwise onto plug 5. The outer surface of the latter is cylindrical and preferably made to fit as tightly in tube 20 as can be practically accomplished while still permitting the parts to telescope together under pressure applied endwise. Since the parts are brought together under power pressure this fit can be originally made much tighter than if the parts were to be assembled by hand. I have found that with an accurately machined cylindrical surface on the plug 5 there will be a variation in the internal diameter of successive tubes 20 of as much as eight thousandths of an inch. So in my desire to get the best pressure fit of the parts I find the beveled shoulder 22 at the end of the plug an advantage in centering the tube under pressure against that shoulder. When the pressure assembly centers the parts and due to the yielding of feather-edge 21 into bell-mouth form, see Fig. 12, the same pressure finally adjusts the length of tubes without leaving gaps, I bore and ream the tapered hole through the tube 20 and the plug 5 to receive pin 23, all while the parts are still held under the pressure of the assembly stand. I then drop pin 23 in the hole and while the tube 20 and its contained plug 5 are supported by a curved anvil underneath, with a hole to receive the pin without contact, said anvil being part of the assembly stand holding the frame horizontally, I hammer the pin 23 home.

The manner of finally positioning the pin in the joint is a feature of my invention and is based on the following considerations. One function of this pin 23 is to expand a plug as 5 into a tighter pressure fit with the tube 20 than can be obtained by a sliding pressure fit between plug and tube, even when the latter is made under power assembly as I use with my assembly stand. The plug is divided as shown by the slot 5' and the hole for the pin 23 has the major part of its longitudinal area in the divided halves of the plug, as shown in Fig. 8. The fit of the pin in its hole, even before driving, is a tight one and the pin is only slightly tapered. It should be understood that the plug parts are very strong and thick as compared with the contacting part of tube 20 which is comparatively thin and weak. When the pin is inserted by hand and before the hammering home begins, the parts are all in close contact and this contact is preferably as close as my manufacturing tolerances allow and the telescope assembly of the tubular joint under power pressure permits. It should also be noted that the tubular parts are centered by their pressure assembly under power with bevels at 21 and 22 acting for the centering effect.

What I want to emphasize is that there is a tight fit of parts before the pin 23 is hammered home. On this account there is very little actual movement of the parts as the pin 23 is hammered home. Such small movement is in effect a power squeezing of the divided plug portion in a generally radial direction to make a tighter fit between tube and plug by pressure of parts already substantially in contact. This is to be contrasted to a translating movement of the parts. The pin insert is for increasing frictional contact in the joint rather than to bring the joint parts into contact for fitting. The latter has been done before the pin 23 in inserted.

When the pin is hammered home to increase the frictional contact it is highly desirable to avoid having the pin driving action break the parts as it may do by splitting the comparatively weak and thin tube 20. I guard against this by making the pin of a material weak enough so that its protruding part will cave in or mushroom before it can go into the plug 5 far enough to break the tube. This is indicated in Fig. 13. The resistance of the strong plug with its surfaces contacting the pin 23 acts as an anvil and resists the pin movement beyond the very slight degree of expansion necessary for what I have termed the squeezing or radial fitting pressure. A hammering on pin 23 tending to go beyond the desired degree of plug expansion will mushroom the head of the pin outside the joint. The material of the pin is chosen for that purpose and any metal soft enough to thus mushroom, but only after tightening the joint, will do my work. The mushroom effect after hammering the pin home is indicated at 23 in Fig. 13.

After the joint is thus assembled and fixed it is finished except for trimming off the parts to improve appearance. This matter of improving appearance is exceedingly important in the metal joints of a bicycle for example, particularly if such a joint is to compete with brazed joints. So as indicated in Fig. 7 and Fig. 12, my joint is made so that there is no gap at line 40 between the tube 20 at its end and the material of the cluster 1. This exactly abutting line 40 is not arrived at by predetermined measurements of the shouldered parts but by providing for the feather-edge overlap at the end of tube 20 thrown outwardly in bell-mouth form at 21 in the pressure assembly and then trimmed off or filed down to line 40 where the parts exactly come together on the surface. There may be a slight gap due to the difference in the angles of bevels at 21 and 22 underneath and a little to one side of line 40, but if such a gap exists as it may, it is an interior gap and completely hidden by the tube 20, the outside of which meets the cluster material on line 40. With the finished joint as seen at 40, Fig. 7, it looks perfect, as in fact it is for my purpose of making the metal joint without heat and to compete in bicycles with brazed joints. In giving the desired appearance it is important to file the protruding ends of pin 23 down smooth and flush with the surface of tube 20. The nature of the joint is such that there is substantially no shearing forces acting between the comparatively weak material of tube 20 and the pin 23 and the pin will stay in place by frictional squeeze of the plug parts due to the slight taper and without being headed over like a rivet. With everything flush the joint is exactly what I want for bicycle manufacturing purposes. It is useful in making aluminum bicycles when brazing is not practical and it is also useful in direct competition with brazed joints as a way to make metal frames in which brazed joints would not be practical.

With the above description the practical bicycle manufacturer will have no difficulty in understanding my disclosure of joining the tubes of the frame generally to the other plugs of the clusters or central supporting frame parts indicated in Figs. 1, 2, 3, and 4. So I will not repeat the operation description. It will be understood that the slant of plug 8 in Fig. 2 indicates a bent top tube 20 for one well known kind of frame.

As I stated before, the clusters 4 of Fig. 4 may be of sheet metal or castings and joined to their tubes in the same manner as in the prior art or as the other tube joints above described, or in other ways. Of all the joints, these at the rear and bottom of the frame are of the least importance, so far as nice appearance is concerned, and where feasible such joints can probably be made most conveniently by spot welding in usual fashion. But where aluminum metal is used the type of joint indicated in Fig. 4 is desirable.

It is usual in the modern frame to have cross braces between the tubes of the upper and lower rear fork members. This braces the tubes connecting the duplicated spaced plugs 13 and 15, and to such braces are fastened the ordinary mudguard. In making the aluminum frame, these braces cannot be assembled in the usual fashion. I show suitable braces in Figs. 5 and 6 for my aluminum frame purpose. They are castings having two foot pieces 42 and 43 which have diverging outer walls to seat the fork tubes along the dotted lines and the tubes are partially embraced by these foot pieces for good contact. The integral cross pieces 44 and 45 have holes 41 and 46 to attach the mudguard. A casting of this type can be slid into place on the rear fork and wedged upwardly to a good fit without straining the tubes. Then small holes are bored through the foot pieces and the adjacent tubes and small rivets may be used to fasten the braces. The braces are conveniently attached when the frame has otherwise been assembled in the pressure assembly stand above mentioned.

When the metal frame is finished it is characterized by the type of joints as described between the tubes and the central supporting stations or cluster points.

Aside from the desire to make an aluminum bicycle frame the new joint and method of assembly have utility in saving factory costs. For example, all or part of the clusters for supporting the tubes can be made of castings, they can be assembled with the tubes, the latter adjusted under pressure to make finished joints, with all parts balanced with respect to the central plane of the bicycle and without the use of heat.

When brazed joints are used in the ordinary bicycle making steps, the frame is first assembled with the parts lightly pinned or spot welded and the brazed joints then made, filed, and ground down in preparation for enameling. All this handling in the factory between initial frame assembly, brazing, grinding, filing, etc., and particularly the heated joint making has a definite tendency to warp the assembled frame out of line. So in ordinary manufacture it is returned to the pressure assembly frame and balanced by bending parts back to line. A steel tubing frame can stand these operations but an aluminum frame cannot bend enough for such corrections. But the labor and time of the corrections and the ordinary steps add up to a substantial cost per frame. By finishing the assembly, making finished unheated joints, and correctly lining up the frame for balance, at one pressure assembly stand as I have described, a lot of expensive factory costs are saved. For this reason there is utility in making a bicycle frame my way of any desired metal, and I do not wish to confine my claims to the utility with relation to making aluminum frames, although there is an increased inventive value in the case of metal where brazing is not suitable for the joints.

It is a well known fact that aluminum and other metal furniture is made of castings and tubing, particularly modernistic furniture. One of the problems in the metal furniture art arises on the question of how to make the joints between the tubing and the principal supporting parts of good appearance and at lower costs than usual. In furniture, as in bicycle frames, the parts have to be accurately aligned and positioned with respect to each other and there is real difficulty in any gap in the joint, even though the joint is strong enough, even with a gap. This has led to much intricate and expensive casting practice to avoid joints. But by making the joints my way, which permits tolerance, easy adjustments to position, and the easy trimming off of the feather-edge on the tube overlap to bring the joint to a nice finish line without gap, difficulties in furniture making with aluminum and other metals are avoided. So I desire to claim my invention in some respects broad enough for this art, as well as to claim it specifically with relation to bicycle manufacture. By the latter I mean of course to include tubular vehicle constructions of all kinds where the same problems arise, such as motorcycles, velocipedes, and airplane structures where the frame is of tubular construction bringing in problems in any way like bicycle frame construction.

Having disclosed my invention, I claim:

1. The method of making a joint in a tubular metal frame which consists in providing a tube coupling member having integral therewith a supporting plug to hold a tube end, finishing said plug to tightly fit the interior of a tube while permitting endwise telescopic assembly, finishing the end edge of the tube with a backwardly slanting bevel face so as to make a feather-edge at the outer end edge of the tube, providing a wedging shoulder on the plug to engage said feather-edge, assembling said tube and plug under endwise pressure sufficient for said wedging shoulder on the plug to force said feather-edge into bell-mouth form, trimming off the bell-mouth edge of the tube to leave only a line joint discernible on the exterior of the tube and plug abutment.

2. The method of claim 1 duplicated for supporting both ends of the tube and with the step of joining the tube with a supporting plug at each end by simultaneous endwise pressure on the plugs and tubes to fit the tube ends on the plugs and form feather-edge bell-mouthed ends on the tube.

3. The method of claim 1 with the step of pinning the plug and tube together and finishing the pin heads flush with the tube surface.

4. The method of joining a metal tube end to a metal support which consists in providing a fork-shaped cylindrical plug on the support to tightly fit the interior of the tube at one end while permitting sliding assembly of the tube and plug under endwise pressure, making a slightly tapered hole transversely of the assembled plug and tube with the major part of the hole area divided between the fork parts of the plug, fitting a pin in said tapered hole with at least one pin end projecting, forcing the pin home to further tighten the fit between the plug and tube, said pin being of soft enough metal to mushroom in the projecting end, after it tightens the parts under force applied on the projecting end, and before it can expand the plug enough to split the tube.

5. The method of claim 4 with the step of finishing any projecting parts of the pin metal flush with the tube metal after the pin is driven to tighten the parts.

6. In a method of making and assembling a bicycle frame the steps of providing a head post cluster support, a seat post cluster support, and a crank case cluster support, each of said supports having a plurality of cylindrical surfaced plugs adapted to tightly fit and assemble into the ends of tubes for connecting the clusters in frame form, simultaneously assembling tubes and clusters under endwise pressure and fixing the tubes and clusters in balanced relation to a common central plane, forcing the tubes and clusters to predetermined frame positions by taking up tolerance material at the tube ends by forcing such ends in the form of feathered edges against shoulders of the plug expanding such edges to bell-mouthed form, and trimming off the said edges to a line joint between the tube and cluster supports, whereby gaps between the supports and tube ends are avoided on the surface of the frame.

7. The method of claim 6 with the step of finally tightening the joints between the tubes and plugs by driving slightly tapered pins transversely through tubes and plugs to engage expanding slots provided in the plugs for tightening them.

8. In a metal frame construction the combination of two principal supporting members spaced apart and each having a cylindrically surfaced supporting plug, a tube spanning between said plugs and tightly fitting over their cylindrical surfaces at the ends, opposed bevels on the plugs and tube end edges, the latter tapering outwardly to meet the plug bevels on substantially a line contact at the surface of the tubes.

9. The structure of claim 8 in combination with additional spaced frame supports and connecting tubes joined to the supports in the same manner.

10. In a bicycle frame the combination of a head post cluster, a seat post cluster, and a crank case cluster and tubes joining the head post cluster with the other two clusters, each tube being joined to its clusters by a joint of the following arrangement: integral cylindrical plugs on the clusters at each end of the tube fitting tightly the interior of the tube and provided with beveled shoulders contacting beveled edges at the ends of the tubes and tending to expand the latter, said joints being held under endwise and radial pressure of the tightly fitting parts and being pinned together.

11. A bicycle frame including a head post support, a seat post support and a crank case support each formed out of a single casting and having integrally formed true cylindrically surfaced tube supporting plugs, the tubes each spanning a pair of said plugs between supports and fitting very tightly over the plugs due to pressure assembly and each joint having an increased frictional hold beyond the cylindrical fit between plug and the interior of the tube, a slightly tapered pin driven under pressure between divided halves of the plug to give the latter a pressure expanding tendency against the tube to provide said increased frictional hold, the latter being provided in the joint without any substantial distortion of the plug surface from its normal cylindrical form which fits the tube tightly.

GEORGE W. CLARK.